United States Patent [19]

Faber et al.

[11] 4,445,752
[45] May 1, 1984

[54] OPTICAL FIBER SWITCH WITH ROTARY GEAR MOVEMENT

[75] Inventors: Johannes W. Faber, Eindhoven, Netherlands; Günter Weick, Eckental, Fed. Rep. of Germany

[73] Assignee: U.S. Philips Corporation, New York, N.Y.

[21] Appl. No.: 405,828

[22] Filed: Aug. 6, 1982

Related U.S. Application Data

[63] Continuation of Ser. No. 183,601, Sep. 2, 1980, abandoned.

[30] Foreign Application Priority Data

Sep. 3, 1979 [NL] Netherlands ............... 7906580

[51] Int. Cl.³ .................................................. G02B 7/26
[52] U.S. Cl. .......................... 350/96.20; 350/96.21
[58] Field of Search .................... 350/96.20, 96.21; 250/229, 236

[56] References Cited

U.S. PATENT DOCUMENTS 4,229,068  10/1980  Hodge et al. ............... 350/96.20

OTHER PUBLICATIONS

"Moving Optical-Fiber Switch Experiment," Applied Optics, vol. 17, No. 22, pp. 3675-3678, Nov. 15, 1978.

Primary Examiner—John D. Lee
Assistant Examiner—Frank González
Attorney, Agent, or Firm—Marc D. Schechter

[57] ABSTRACT

A switch for making and breaking optical connections of optical fibers, by connecting one fiber to another fiber of a group of fibers. The coupling of fibers is realized in a V-groove in a first holder. The switch comprises two holders, each of which comprises a gear ring. These rings are made to engage by means of a helical spring. The first holder accommodates several fibers which are equidistantly distributed over its circumference. A coupling between two fibers is broken by pulling the holders apart (against the force of the spring). By subsequently rotating the holders and moving the holders towards each other again, a coupling between the fiber on the second holder and a further fiber on the first holder is realized. The second holder comprises a positioning ring which provides coarse orientation of the holders with respect to each other. The two gear rings provide exact final positioning of the holders.

3 Claims, 3 Drawing Figures

OPTICAL FIBER SWITCH WITH ROTARY GEAR MOVEMENT

This is a continuation of application Ser. No. 183,601, filed Sept. 2, 1980, now abandoned.

BACKGROUND OF THE INVENTION

The invention relates to a switch for optically coupling, by means of a V-groove, an optical fiber to one of at least two other optical fibers. Switching is achieved by displacement of the former fiber with respect to the two other fibres, each of the other fibers being arranged in a separate V-groove.

A switch of this kind is described in an article by Hisao Yamamoto and Harno Ogiwara, published in Applied Optics, entitled "Moving Optical Fiber Switch Experiment". Vol. 17, No. 22, Nov. 15, 1978, pp. 3675 to 3678. The switch described therein comprises a carrier in which radially directed grooves are provided in one plane. On one side, one fiber is permanently secured in each groove, while on the other side one fiber is to be arranged which is to be coupled to the permanently secured fibers. In a switch of this kind, switching (i.e. the breaking of a coupling between a first and a second fiber and the subsequent coupling of the first fiber to another fiber) is realized by lifting the first fiber out of the groove, laterally displacing the fiber, and arranging the fiber in another groove. It will be clear that the described manipulations have to be performed with a high degree of precision, which is a drawback.

Furthermore, the distance between the ends of the fibers coupled in the described manner may not be larger than a few tens of micrometers (30 $\mu$m), and the end faces of the coupled fibers may not contact each other. This requirement again necessitates very precise manipulation of the fibers to be shifted. It will be clear that a switch of the described kind should comprise a switching mechanism which is made of precision components, so that it is expensive.

SUMMARY OF THE INVENTION

It is an object of the invention to provide a switch which does not comprise precision components except for the V-shaped grooves, so that it can be economically manufactured.

It is a further object of the invention to provide a switch in which the switching function can be simply executed. (The switching function is to be understood to means herein the coupling of, for example, a fiber to an arbitrary other fiber or the simultaneous coupling of, for example, at least two fibers to a corresponding number of further fibers; a fixed relationship then exists between at least two pairs of coupled fibers).

To this end, the switch according to the invention comprises a first and a second holder. The first holder is provided on its circumference with V-shaped grooves which extend in the direction of a longitudinal axis. At one side of the holder, the grooves change over into a funnel-shaped inlet opening. The grooves are equidistant from the longitudinal axis, and connecting lines from the grooves to a point on the longitudinal axis all enclose the same pitch angle or a multiple thereof.

An end face of the first holder is provided, at the side of the inlet opening, with a gear ring which is directed transverse to the longitudinal axis and which is concentric thereto. The gear ring aligns in cooperation with a substantially identical gear ring on an end face of the second holder, at least one V-shaped groove which is formed in the circumference of the second holder (and which extends parallel to the longitudinal axis), with respect to a further groove in the first holder. The holders engage the gear rings by way of a resilient connection which permits displacement along the longitudinal direction against a spring force. After the longitudinal displacement it is still possible to rotate the holders with respect to each other. The magnitude of the rotation is determined by the engaging of the gear rings when the first holder springs back to the second holder, the magnitude being equal to the pitch angle or a multiple thereof.

The switch according to the invention offers the advantage that no precision operations are required, except for the manufacture of the V-grooves. Operation of the switch provides a coupling between two optical fibers in one of the V-grooves of each of the holders. A first fiber is secured in a V-groove of the first holder and a second fiber is secured in a V-groove of the second holder. The coupling is broken by displacement of the second holder against the spring force of the connection, and the second fiber is pulled out of the V-groove and the funnel-shaped inlet opening of the first holder. Subsequently, the holders can be rotated with respect to each other, the second fibers then being arranged opposite another inlet opening. When the second holder is then released, the second fiber will be slid, via a funnel-shaped inlet opening, into the asscociated V-groove where it is coupled to a fiber secured in this groove. The gear rings ensure that the holders occupy the desired position with respect to each other. In order to ensure that the V-grooves in the first and the second holder are exactly aligned when the gear rings engage, first the gear rings of the holders are manufactured and subsequently the V-grooves are manufactured. To manufacture the V-grooves, the first and the second holder are clamped, for example, in a milling machine with the gear rings in the engaged condition.

A preferred embodiment of the switch according to the invention is characterized in that the second holder comprises a holder body comprising the gear ring and a positioning ring which is secured at the end of the holder body adjoining the gear ring. The inner cross-section of the positioning ring is substantially complementary to the outer cross-section of the first holder at the side of the gear ring thereof.

The positioning ring ensures that the holders (after having been pulled apart) cannot be moved towards each other after rotation with respect to each other, unless the fiber in the second holder is situated opposite an inlet opening of the first holder, because the end of the first holder must fit in the positioning ring. A construction of this kind prevents damaging of the end of the fiber secured in the groove of the second holder by incorrect switching (by rotation through an angle which is too small or too large).

DESCRIPTION OF THE PREFERRED EMBODIMENTS

Figure 1:
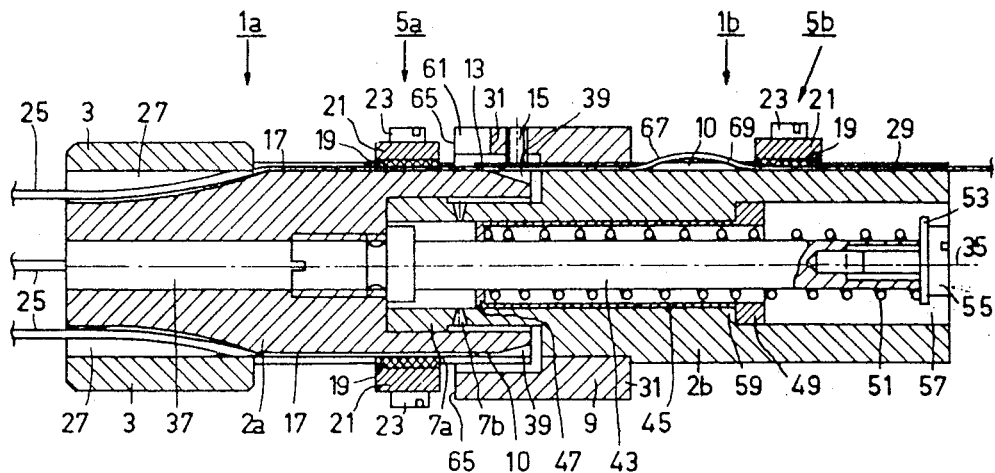
FIG. 1 is a longitudinal sectional view of a switch according to the invention

FIG. 1 is a longitudinal sectional view of the switch in accordance with the invention, comprising a first holder 1a and a second holder 1b. The first holder 1a comprises a first holder body 2a, a clamping ring 3, clamping means 5a and a gear ring 7a. The second holder 1b comprises a second holder body 2b, a positioning ring 9, clamping means 5b, and a pressure means 13. Pressure means 13 secured in the positioning ring 9 and is shaped as a leaf spring. Its spring force is adjustable by means of an adjusting screw 15.

Figure 3:
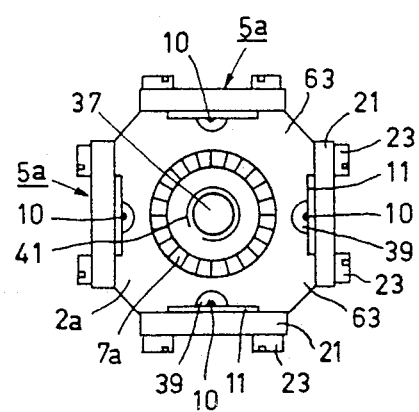
FIG. 3 is a front view of a holder of an embodiment of the switch according to the invention.

The holder bodies 2a and 2b each have an elongate shape and a regular, square cross-section with bevelled corners 63, as shown in FIG. 3. In each of the four elongate sidewalls of the holder body 2a there are provided V-shaped grooves 10 (see FIG. 3), in which optical fibers 17 are secured. Preferably, the two holder bodies 2a and 2b are provided with shallow, flat recesses 11 during one operation, for example, by milling; in these recesses there are provided the V-grooves 10 which are then situated exactly one in the prolongation of the other.

Each of the fibers 17 is secured in the grooves 10 by means of a clamping means 5a which consists of an elastic cushion 19 (for example, of rubber), a pressure plate 21 and two bolts 23. A secondary jacket 25 of the fibers 17 is clamped, by way of clamping ring 3, in the troughs 27 formed in the holder body 2a.

Figure 2:
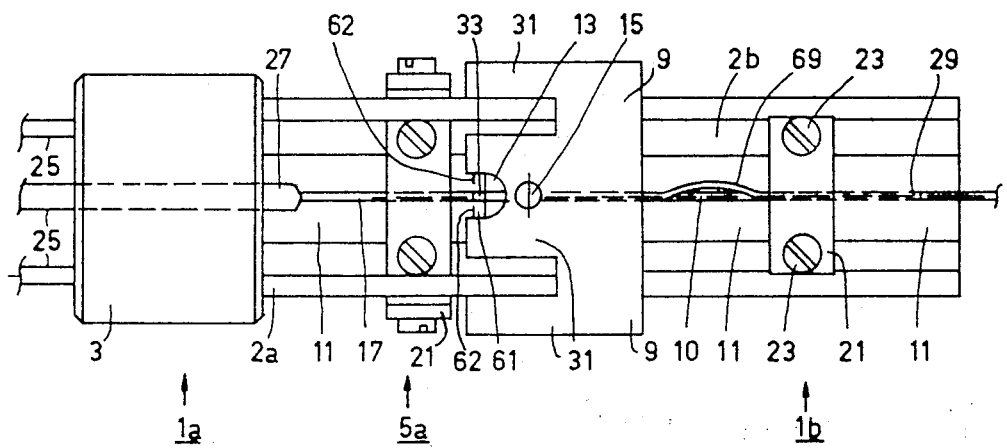
FIG. 2 is a plan view of the switch of FIG. 1.

The holder body 2b is provided with a V-shaped groove 10 on only one side (see FIG. 2). A fiber 29 is secured in this groove 10 by means of clamping means 5b which consists of an elastic (rubber) cushion 19, a pressure plate 21, and two bolts 23.

On the holder body 2b there is secured the positioning ring 9 which comprises four wings 31 which extend parallel to the four sides of the holder body 2b and also parallel to the four sides of the holder body 2a in the coupled condition of two fibers 17 and 29. In the positioning ring 9 there is secured a pressure means 13 in the form of a phosphor bronze leaf spring which presses, in conjunction with an adjusting screw 15, the end 33 of the fiber 29 towards a central axis 35 of the switch and forces it into the V-groove in the holder body 2a in the coupled condition of two fibers 17 and 29.

The holder body 2a has a bore 37 which is enlarged at the side of inlet openings 39. The annular gear ring 7a which should cooperate with the gear ring 7b formed on the holder body 2b is pressed or glued into the recess obtained, for example, by the milling of the bore 37. The gear ring 7a is preferably glued in the bore 37 because mechanical stress and hence deformation of the holder 2a is thus avoided.

On the side of a gear ring 7a, the bore 37 is provided with a thread 41 in which a bolt 43 is secured. Around the bolt 43 there is arranged a bush 45 which comprises an inner collar 47 and an outer collar 49. The inner collar 47 is contacted by a helical spring 51 which contacts, on the other side of the bolt 43, a ring 53 which is connected to the bolt by way of a lock screw 55 which is screwed into the threaded hollow end of the bolt 43. The outer collar 49 of the bush is pressed, under the influence of the helical spring 51, against a rim 59 formed in the bore 57 of the holder body 2b, so that the gear rings 7a and 7b engage.

FIGS. 2 and 3 are a plan view and a front view of the switch and the holder 1a, respectively. Corresponding parts are denoted by corresponding reference numerals. FIG. 2 clearly shows how the wings 31 of the positioning ring 9 engage around the holder body 2a when the gear rings 7a and 7b engage. Furthermore, the wing 31 on the side of the V-groove in the holder 1b has a recess 61 which leaves a mark 62 free on the holder body 2a. The optical fibers 17 in the V-grooves of the holder 1a are slid underneath the loose clamping means as far as the mark 62, after which the fibers 17 are secured by means of the clamping means 5a. Positioning and sliding a fiber 17 in the V-groove can be performed with the naked eye, because the fiber end need not reach exactly as far as the mark 62 as will be described hereinafter. Tolerances of from some tenths of to one half millimeter in the position of the end of a fiber do not influence the coupling efficiency to be reached.

After a fiber 17 has been arranged and secured in each V-groove 10 in the holder 1a, the secondary jacket 25 of the fibers is secured by means of the clamping ring 3. The fiber 29, secured in the holder 1b, is then slid into the V-groove 10 after the two holders 1a and 1b have been pulled apart against the force of spring 51 and rotated through one eighth of a turn with respect to each other. After the release of a holder, the positioning ring 9 will then bear on the corners 63 of the holder body 2a by way of the wings 31. In this position of the holders 1a and 1b, the fiber 29 is slid into the groove of the holder 1b beyond the pressure spring 13 to a position just in front of the outer edge 65 of the positioning ring 9, so that the fiber just fails to contact the holder body 2a. The fiber is clamped. after which the switch is ready for use, Damage to the fiber 29 during the rotation of the one holder with respect to the other holder is precluded.

When the holder 1a is rotated with respect to the holder 1b, the wings 31 will enclose the flat sides of the holder body 2a in a given position of the holder 1a with respect to the holder 1b. As a result, the holders are drawn towards each other due to the spring force of the helical spring 51. The fiber 29 mounted in the holder 1b is slid, via an inlet opening 39 into a V-groove of the holder 1a (the leaf spring keeps the fiber 29 pressed into the V-groove), and an end of the fiber 29 is positioned against an end of the fiber 17 arranged in the V-groove of the holder 1a.

During the movement of the holders 1a and 1b towards each other, the gear rings 7a and 7b engage, so that the contacting of the fiber ends exactly positions the holders 1a and 1b with respect to each other. Because the outer edge 65 extends beyond the mark 62, the end faces of the fibers thus coupled will already contact each other before termination of the movement of the holders towards each other. In order to compensate for the further movement of the fiber after the contacting of the end faces, an expansion space 67 is created between the positioning ring 9 and the clamping means 5b. An arc 69 is formed in the fiber in the expansion space in order to compensate for the further movement. The wing 31 locates the fiber 29 in the groove 33 so that the fiber can perform only an axial displacement. The advantage thereof consists in that the end faces are always pressed together with a slight force. Expansion and shrinking of the fiber and various parts in reaction to temperature fluctuations are thus also compensated for.

By pulling the two holders 1a and 1b apart and by rotating the holders with respect to each other and by moving the holders back towards each other again, a coupling between a first and a second fiber can be broken and a coupling can be established between the second and a third fiber. One optical connection is switch off and another optical connection is switched on, without requiring precision manipulations during switching.

Obviously, when the switch is prepared for operation, alternatively first the fiber 29 can be inserted into the V-groove, the end of the fiber being arranged between the mark 62 and the outer edge 65. Subsequently, the holders 1a and 1b are pulled apart and the holders are rotated with respect to each other, so that the wings 31 bear on the holder body 2a. Subsequently, the fibers 17 are arranged in the grooves of the holder 1a in the described manner.

Obviously, it is alternatively possible to provide the holder 1b with more than one groove in order to enable the simultaneous switching on and off of more than one optical connection. It will also be obvious that the holder 1b can be provided with a clamping ring or the like for securing the secondary jacket of the fiber (fibers).

The holder bodies 2a and 2b, the positioning ring 9, the pressure plates 21 and the clamping ring 3 may be made of metal or a synthetic material. In the latter case, an injection molding process can be advantageously used. However, it is important that the V-groove at the area of the coupling between the ends of the fibers is hard and rigid. When a synthetic material is used for manufacturing the holder body 2a, the V-groove may be provided in a hardmetal or glass plate which is introduced into a recess in the holder body 2a.

In order to improve the coupling efficiency, a coupling liquid having a refractive index which is adapted to the refractive indices of the fibers can be introduced between the ends of the fibers to be coupled. Depending on the viscosity of the coupling liquid, it can serve as a cushion between the ends of the fibers during switching. The attenuation of light measured in a switch according to the invention amounted to 0.2 dB. During the measurement, use was made of a coupling liquid between the fibers. The fibers had an active core diameter of 50 $\mu$m with a parabolic variation of the refractive index as a function of the radius of the fiber core.

What is claimed is:

1. A switch for optically coupling a first optical fiber to two or more other optical fibers, the first optical fiber being connected to one other optical fiber at a time, said switch comprising:

a first holder having a longitudinal axis and having an exterior surface, said holder having two or more V-shaped grooves on the exterior surface equidistant from and extending parallel to the longitudinal axis, said V-shaped grooves being situated around the longitudinal axis at either equal angular separations or angular separations which are a multiple of a given pitch angle, said V-shaped grooves in operation accommodating optical fibers, said holder having a first side at which the V-shaped grooves each transform into a funnel-shaped inlet opening, the first side of the holder having an end face on which is provided a first gear ring which is transverse to and concentric with the longitudinal axis;

a second holder having an exterior surface with at least one V-shaped groove on the exterior surface extending parallel to the longitudinal axis, said V-shaped groove in operation accommodating an optical fiber, said second holder having an end face on which is provided a second gear ring which is transverse to and concentric with the longitudinal axis; and means for resiliently connecting the holders by engaging the first and second gear rings to each other, said means permitting displacement of the holders along the longitudinal axis against a spring force to disengage the gear rings, and said means permitting relative rotation of the holders around the longitudinal axis when the gear rings are disengaged, the magnitude of the relative rotation after the gear rings are reengaged being equal to the pitch angle or a multiple thereof.

2. A switch as claimed in claim 1, characterized in that the second holder comprises:

clamping means, at an end of the holder remote from the gear rings, for clamping an optical fiber in the V-groove of the second holder; and pressure means, at the end of the holder near the gear ring, for pressing the end of the fiber into a V-groove in the first holder when the gear rings are engaged;

whereing an expansion space is provided between the clamping means and the pressure means.

3. A switch as claimed in claim 1 or 2, characterized in that the second holder further comprising a positioning ring secured to the end of the second holder which adjoins the gear ring, the positioning ring having an inner cross-section which substantially matches the outer cross-section of the first side of the first holder.

* * * * *